(12) United States Patent
Ohara

(10) Patent No.: US 11,297,653 B2
(45) Date of Patent: Apr. 5, 2022

(54) USER EQUIPMENT AND PREAMBLE TRANSMISSION METHOD

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 51 days.

(21) Appl. No.: 16/762,700

(22) PCT Filed: Nov. 16, 2017

(86) PCT No.: PCT/JP2017/041369
§ 371 (c)(1),
(2) Date: May 8, 2020

(87) PCT Pub. No.: WO2019/097653
PCT Pub. Date: May 23, 2019

(65) Prior Publication Data
US 2021/0176787 A1    Jun. 10, 2021

(51) Int. Cl.
*H04W 74/08*    (2009.01)
*H04W 56/00*    (2009.01)

(52) U.S. Cl.
CPC ..... *H04W 74/0833* (2013.01); *H04W 56/001* (2013.01)

(58) Field of Classification Search
None
See application file for complete search history.

(56) References Cited

U.S. PATENT DOCUMENTS

2016/0066255 A1\* 3/2016 Marinier ............ H04W 56/001
370/350

FOREIGN PATENT DOCUMENTS

EP      3419340 A1    12/2018
WO   2017/155239 A2     9/2017

OTHER PUBLICATIONS

ZTE, 4 step random access procedure (Year: 2017).\*
Extended European Search Report issued in counterpart European Patent Application No. 17932352.2, dated Jun. 10, 2021 (14 pages).
ZTE; "4-step random access procedure"; 3GPP TSG RAN WG1 #89 Meeting , R1-1707049; Hangzhou, P.R. China; May 15-19, 2017 (15 pages).

(Continued)

*Primary Examiner* — Ayanah S George
(74) *Attorney, Agent, or Firm* — Osha Bergman Watanabe & Burton LLP

(57) ABSTRACT

In one aspect of the present invention, user equipment for transmitting a preamble at any timing after synchronization with a base station includes a reception unit that detects a synchronization signal or a physical broadcast channel from the base station; a resource selection unit that determines resources available for transmission of the preamble based on configuration information for preamble transmission, and selects, from the resources available for transmission of the preamble, a resource for transmitting the preamble according to the detected synchronization signal or the detected physical broadcast channel based on a mapping rule; and a transmission unit that transmits the preamble to the base station on the selected resource.

7 Claims, 9 Drawing Sheets

(56) References Cited

OTHER PUBLICATIONS

ZTE, Sanechips; "Remaining details of RACH procedure"; 3GPP TSG RAN WG1 Meeting #90bis, R1-1717036; Prague, Czech Republic; Oct. 9-13, 2017 (25 pages).
3GPP TS 36.211 V14.2.0 "3rd Generation Partnership Project; Technical Specification Group Radio Access Network; Evolved Universal Terrestrial Radio Access (E-UTRA); Physical channels and modulation (Release 14)" Mar. 2017 (194 pages).
3GPP TSG RAN WG! AH_NR Meeting; R1-1701581 "4-step Random Access Procedure" ZTE, ZTE Microelectronics; Athens, Greece; Jan. 13-17, 2017 (14 pages).
3GPP TSG-RAN WG1 NR adhoc; R1-1700298 "NR PRACH design" Ericsson; Spokane, USA; Jan. 16-20, 2017 (23 pages).
International Search Report issued in International Application No. PCT/JP2017/041369, dated Feb. 13, 2018 (5 pages).
Written Opinion issued in International Application No. PCT/JP2017/041369; dated Feb. 13, 2018 (3 pages).
Examination Report issued in Indian Patent Application No. 202037024917, dated Aug. 24, 2021.

\* cited by examiner

USER EQUIPMENT AND PREAMBLE TRANSMISSION METHOD

TECHNICAL FIELD

The present invention relates to user equipment and a preamble transmission method.

BACKGROUND ART

In Third Generation Partnership Project (3GPP), communication standards (5G or NR) as a next generation of Long Term Evolution (LTE) and LTE-Advanced have been discussed. In an NR system, as in LTE and the like, it is expected that random access will be performed in the case where user equipment (UE) establishes a connection or a re-connection with a base station (eNB or eNodeB).

A channel for transmitting a preamble initially in random access is referred to as a physical random access channel (PRACH). Configuration information (RACH Configuration) regarding the PRACH is provided by the base station to the user equipment using an index. In other words, the user equipment selects a resource (hereinafter referred to as a RACH resource) of the PRACH based on the RACH Configuration provided by the base station (see Non-Patent Document 1).

PRIOR-ART DOCUMENTS

Non-Patent Documents

[Non-Patent Document 1] 3GPP TS36.211 V14.2.0 (2017-03)

DISCLOSURE OF INVENTION

Problem(s) to be Solved by the Invention

In NR, as in LTE and the like, it is expected that user equipment will select one or more RACH resources based on a RACH Configuration provided by a base station. In NR, it is considered that a primary synchronization signal (PSS), a secondary synchronization signal (SSS), and a physical broadcast channel (PBCH) can be repeatedly transmitted in a time direction. A resource in which the PSS, the SSS, and the PBCH are placed is referred to as a synchronization signal (SS) block. A series of repeatedly-arranged SS blocks is referred to as an SS burst set. It is expected that when the user equipment can detect an SS block, the user equipment will select one or more RACH resources from a plurality of resources which are determined based on the RACH Configuration.

However, the number of resources, available for RACH in one period, which are determined based on a RACH Configuration is not necessarily the same as the number of resources associated with SS blocks in an SS burst set. Therefore, it is necessary to determine, from the resources available for RACH which are determined based on the RACH Configuration, a RACH resource to be selected according to an SS block detected by the user equipment.

It is an object of the present invention to provide a solution to select an appropriate RACH resource according to an SS block detected by the user equipment.

Means for Solving the Problem(s)

In one aspect of the present invention, there is provision for user equipment for transmitting a preamble at any timing after synchronization with a base station, including:

a reception unit that detects a synchronization signal or a physical broadcast channel from the base station;

a resource selection unit that determines resources available for transmission of the preamble based on configuration information for preamble transmission, and selects, from the resources available for transmission of the preamble, a resource for transmitting the preamble according to the detected synchronization signal or the detected physical broadcast channel based on a mapping rule; and a transmission unit that transmits the preamble to the base station on the selected resource.

Advantageous Effect of the Invention

According to the present invention, it is possible to select an appropriate RACH resource according to an SS block detected by the user equipment.

DETAILED DESCRIPTION OF THE PREFERRED EMBODIMENTS

In the following, embodiments will be described with reference to the drawings. Note that the embodiments described below are merely examples, and an embodiment to which the present invention can be applied is not necessarily to be limited to the following embodiments.

In the embodiments, terms defined in LTE are used for description as needed. Also, it is possible to use the existing technologies defined in LTE as needed for operation of a radio communication system. However, the existing technologies are not limited to those in LTE. Also, unless otherwise specified, the term "LTE" in the present specification is used in a broader sense covering LTE-Advanced or later. Although the embodiments will be described with respect to preamble transmission during random access, the present invention can be also applied to preamble transmission at any timing after synchronization with a base station.

In the embodiments, although the existing terms used in LTE, such as a PSS, an SSS, a PBCH, a RACH, and a preamble, are used for convenience of explanation, signals and so on represented by these terms may be differently termed.

Overview of Radio Communication System

Figure 1:
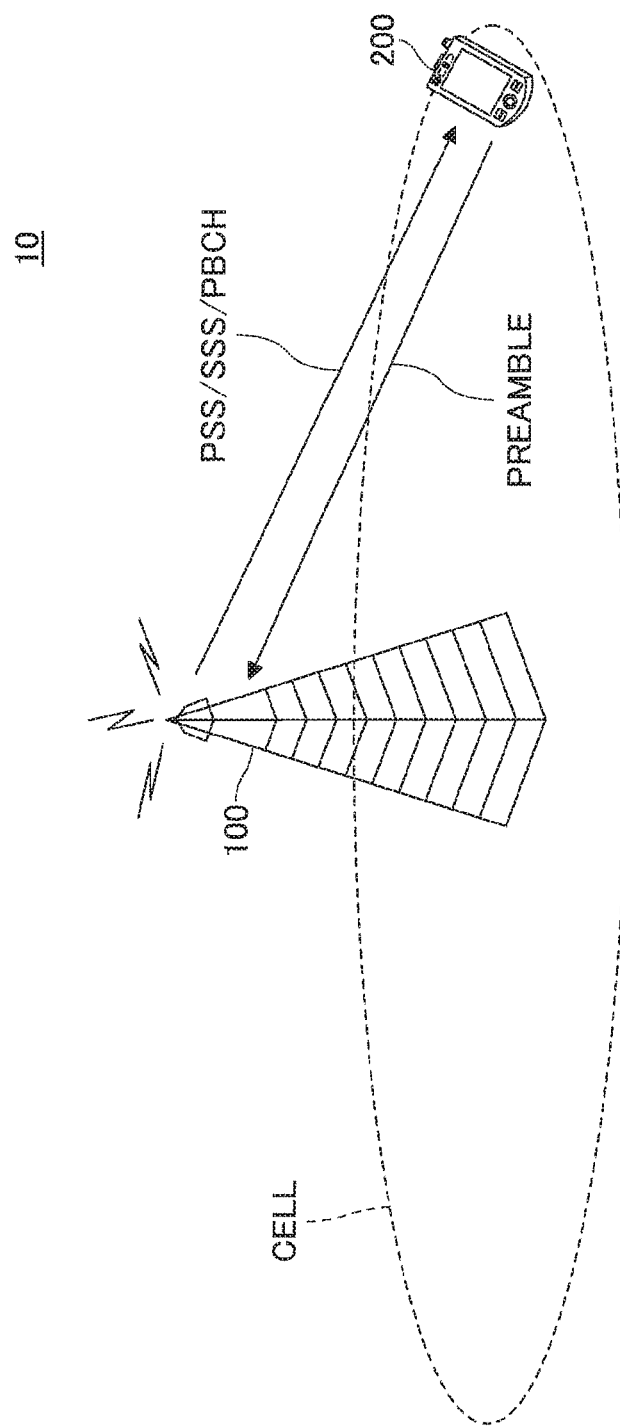
FIG. 1 is a schematic diagram of a radio communication system according to an embodiment of the present invention.

FIG. 1 is a configuration diagram of a radio communication system 10 according to an embodiment of the present invention. As shown in FIG. 1, the radio communication system 10 according to this embodiment includes a base station 100 and user equipment 200. While one base station 100 and one unit of user equipment 200 are illustrated in FIG. 1, a plurality of base stations 100 or plural units of user equipment 200 may be included. The base station 100 may be referred to as "BS" and the user equipment 200 may be referred to as "UE".

The base station 100 can accommodate one or more (for example, three) cells (also referred to as "sectors"). When the base station 100 accommodates a plurality of cells, the entire coverage area of the base station 100 can be divided into a plurality of small areas, and in each small area, a communication service can be provided through a base station subsystem (for example, a small indoor base station remote radio head (RRH)). The term "cell" or "sector" refers to a part or whole of the coverage area in which the base station and/or the base station subsystem provides a communication service. Further, the terms "base station", "eNB", "cell", and "sector" can be used interchangeably in this specification. In some cases, the base station 100 is also referred to as a fixed station, a NodeB, an eNodeB (eNB), an access point, a femto cell, a small cell, or the like.

In some cases, the user equipment 200 is referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

The base station 100 or the user equipment 200 can use beamforming with a narrow beam width to compensate for propagation loss in a high frequency band. To transmit a signal using beamforming, the base station 100 or the user equipment 200 determines a direction of a transmission beam (Tx-beam) using beam sweeping or the like, so that quality of a received signal on the other end is high. Similarly, to receive a signal using beamforming, the base station 100 or the user equipment 200 determines a direction of a reception beam (Rx-beam), so that quality of a signal transmitted from the other end is high.

For example, when the user equipment 200 establishes a connection to the base station 100 or re-synchronizes with the base station 100 for originating a call, for handover, or the like, random access is performed. In random access, the user equipment 200 transmits a preamble (PRACH preamble) which is selected from a plurality of preambles prepared in the cell. When the base station 100 detects the preamble, the base station 100 transmits a RACH response (PAR) that is a response to the preamble. When the user equipment 200 receives the RAR, the user equipment 200 transmits an RRC Connection Request as a message 3. After receiving the message 3, the base station 100 transmits an RRC Connection Setup as a message 4 including cell configuration information or the like for establishing a connection. When the user equipment 200 determines that its own UE ID is included in the message 4, the user equipment 200 completes the random access procedure and establishes a connection.

A channel for transmitting a preamble initially in random access is referred to as a physical random access channel (PRACH). Candidates for configuration information (RACH Configuration) with respect to the PRACH are defined in advance in a table referred to as a RACH Configuration Table, for example, in which an index is assigned to each RACH Configuration. The base station 100 provides an index in the RACH Configuration Table to the user equipment 200 via broadcast information or the like, so as to indicate locations, the number, a density, or the like of resources available for transmission of the preamble. The user equipment 200 can determine resources available for transmission of the preamble based on the provided index (i.e., based on a RACH Configuration corresponding to the provided index). For example, the resources available for transmission of the preamble are periodically arranged in a predetermined portion of resources in a time domain and a frequency domain. The RACH Configuration may be referred to as configuration information for preamble transmission.

The base station 100 can transmit a PSS, an SSS, or a PBCH using a plurality of SS blocks in an SS burst set by changing a direction of a transmission beam, for example. The SS burst set is repeatedly arranged in a period of 20 ms or the like, for example. The number L of SS blocks in the SS burst set depends on a frequency band. For example, L is equal to 4 in 3 GHz or lower, L is equal to 8 in 3-6 GHz, and L is equal to 64 in 6-52.6 GHz. All the L SS blocks may not be necessarily used, but the base station 100 can use any number of SS blocks within the L SS blocks.

When the user equipment 200 detects the PSS, the SSS, or the PBCH, the user equipment 200 selects, from the resources available for transmission of the preamble, a RACH resource associated with the SS block in which the detected PSS, the detected SSS, or the detected PBCH is placed. The user equipment 200 transmits a preamble on the selected RACH resource. By using a correspondence between an SS block and a RACH resource, the base station 100 can identify which of the SS blocks in the SS burst set can be detected by the user equipment 200. The correspondence between the SS block and the RACH resource will be described with reference to FIG. 2.

Figure 2:
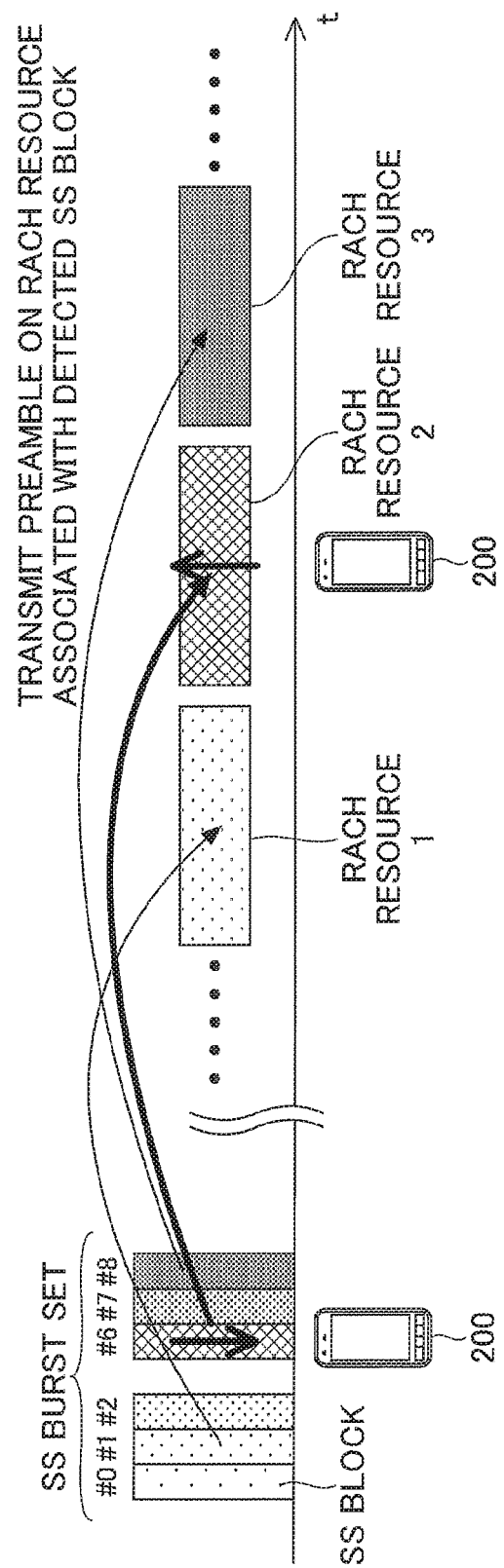
FIG. 2 is a diagram illustrating a correspondence between an SS block and a RACH resource.

FIG. 2 is a diagram illustrating a correspondence between an SS block and a RACH resource. The user equipment 200 can determine resources (a RACH resource 1, a RACH resource 2, a RACH resource 3, . . . ) available for transmission of a preamble based on a RACH Configuration. For example, a mapping rule defining a correspondence between an SS block in an SS burst set and a RACH resource may be provided by the base station 100 to the user equipment 200 via broadcast information or the like, or may be defined in advance in the specification. The mapping rule can be arbitrarily defined. For example, as shown in FIG. 2, the mapping rule may be defined such that a preamble for an SS block #1 is transmitted on the RACH resource 1, a preamble for an SS block #6 is transmitted on the RACH resource 2, and so on. It should be noted that one SS block may correspond to a plurality of RACH resources (a plurality of time resources or a plurality of frequency resources). Further, as described below, a mapping rule defining that different resources with respect to the time direction are selected for different SS blocks may be used.

Further, for example, the number of preamble indexes available for an SS block and the number of preamble indexes available for a RACH resource may be provided by the base station 100 to the user equipment 200 via broadcast information or the like, or may be defined in advance in the specification.

The user equipment 200 selects a RACH resource associated with an SS block in which a PSS, an SSS, or a PBCH is placed and transmits a preamble to the base station 100. For example, when the user equipment 200 can detect a PSS, an SSS, or a PBCH in the SS block #6, the user equipment 200 selects the RACH resource 2 associated with the SS block #6. When the number of preamble indexes available for the SS block #6 and the number of preamble indexes available for the RACH resource 2 are provided or defined, the user equipment 200 determines a range of preamble indexes which can be used on the RACH resource 2. Then, the user equipment 200 selects a preamble within the determined range of preamble indexes and transmits the preamble to the base station 100.

Example 1

Figure 3:
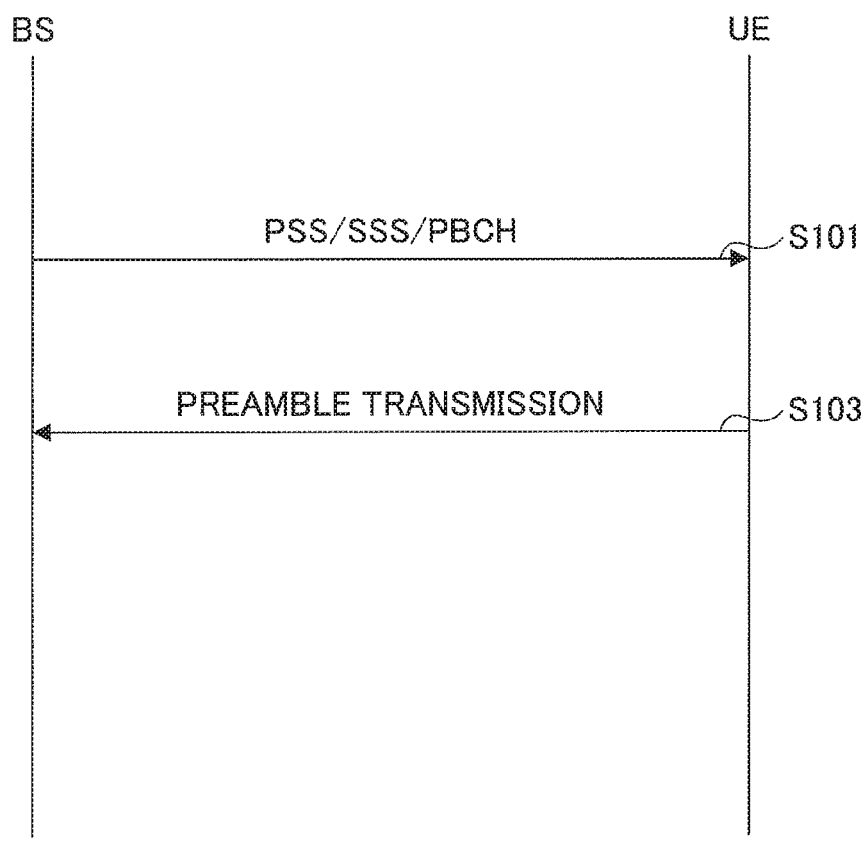
FIG. 3 is a sequence diagram illustrating a preamble transmission procedure in a radio communication system according to an embodiment of the present invention.
Figure 4:
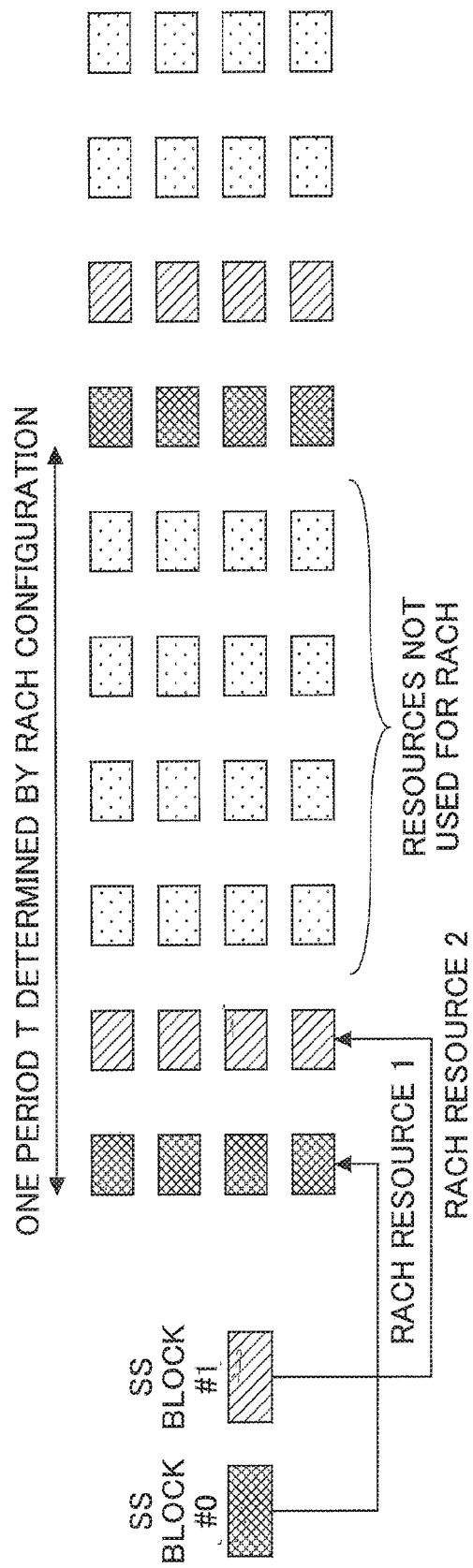
FIG. 4 is a diagram illustrating an example 1 of selecting a RACH resource for transmitting a preamble.

Next, with reference to FIGS. 3 and 4, an example 1 of a preamble transmission procedure in a radio communication system according to the embodiment will be described in detail. FIG. 3 is a sequence diagram illustrating the preamble transmission procedure in the radio communication system according to the embodiment. FIG. 4 is a diagram illustrating the example 1 of selecting a resource for transmitting a preamble.

The base station 100 transmits a PSS, an SSS, and a PBCH to the user equipment 200 (S101). The PSS is used for time synchronization, frequency synchronization, detection of part of a cell ID, and so on, the SSS is used for detection of the cell ID and so on, and the PBCH includes part of system information required for initial access. The PSS, the SSS, and/or the PBCH are placed in a resource referred to as an SS block in an SS burst set, and transmitted to the user equipment 200. The user equipment 200 attempts to detect the PSS, the SSS, and the PBCH in the SS burst set. When the user equipment 200 can detect the PSS, the SSS, and the PBCH, the user equipment 200 can receive other system information transmitted on a physical downlink shared channel (PDSCH), for example. In this example, system information transmitted on the PBCH and system information transmitted on another channel such as the PDSCH are collectively referred to as broadcast information.

The broadcast information provided to the user equipment 200 may include a RACH Configuration (for example, an index in a RACH Configuration Table), a mapping rule defining a correspondence between an SS block in an SS burst set and a RACH resource, the number of preamble indexes available for an SS block, the number of preamble indexes available for a RACH resource, and so on. In the embodiment, it is assumed that these pieces of information are included in the broadcast information. However, any of these pieces of information may be provided to the user equipment 200 via control information (for example, RRC signaling, DCI, or the like) other than the broadcast information, or may be defined in advance in the specification.

The user equipment 200 determines resources available for transmission of a preamble based on the RACH Configuration included in the broadcast information. For example, as shown in FIG. 4, the user equipment 200 may determine, based on the RACH Configuration, that six resources in the time direction and four resources in the frequency direction are available in one period with a specified duration. The length T of one period may be determined in consideration of the number of SS blocks in the SS burst set. For example, when the SS burst set includes eight SS blocks and one RACH resource in the time direction is used for one SS block, the length T of one period is determined such that at least eight resources in the time direction are available in the period.

The user equipment 200 selects, from the resources available for transmission of the preamble, a RACH resource associated with the SS block in which the detected PSS, the detected SSS, or the detected PBCH is placed using a mapping rule defining a correspondence between an SS block in an SS burst set and a RACH resource. For example, as shown in FIG. 4, the mapping rule defines that a preamble for an SS block #0 is transmitted on a RACH resource 1, a preamble for an SS block #1 is transmitted on a RACH resource 2, and so on. Using this mapping rule, when the user equipment 200 can detect the PSS, the SSS, or the PBCH in the SS block #0, the user equipment 200 selects the RACH resource 1. When the user equipment 200 can detect the PSS, the SSS, or the PBCH in the SS block #1, the user equipment 200 selects the RACH resource 2. The locations of the RACH resource 1 and the RACH resource 2 can be arbitrarily configured. For example, the RACH resource 1 and the RACH resource 2 may be frequency-multiplexed at the same timing.

It should be noted that all of the resources, available for transmission of the preamble in one period, which are determined based on the RACH Configuration may not be necessarily used for RACH. For example, as shown in FIG. 4, when only the SS block #0 and the SS block #1 are included in the SS burst set, resources other than the RACH resource 1 and the RACH resource 2 are not used for RACH. In the example 1, the user equipment 200 selects, from the resources, available for transmission of the preamble, which are determined based on the RACH Configuration, a RACH resource associated with the SS block according to the mapping rule. Then, resources which are not, used for RACH may be used for another purpose such as transmission of another channel (for example, a data channel or a control channel).

The user equipment 200 transmits a preamble to the base station 100 on the selected resource (S103). When the number of preamble indexes available for an SS block and the number of preamble indexes available for a RACH resource are provided, the user equipment 200 determines a range of preamble indexes which can be used on the RACH resource based on the number of preamble indexes available for the SS block and the number of preamble indexes available for the RACH resource.

For example, 128 preamble indexes 0-127 are available for one SS block and 64 preamble indexes are available for one RACH resource, it is understood that at least two RACH resources need to be reserved for one SS block. For example, as shown in FIG. 4, when four RACH resources are reserved, the user equipment 200 selects a preamble within the range of preamble indexes 0-63 on a first RACH resource and the third RACH resource, and selects a preamble within the range of preamble indexes 64-127 on the second RACH resource and the fourth RACH resource. The usable range of preamble indexes as described above is merely an example. For example, the user equipment 200 may select a preamble within the range of preamble indexes 0-63 on all the first to fourth RACH resources. In this case, the same preamble index for the SS block may be selected on all the RACH resources, and their resources may be distinguished based on a time and a frequency.

As described above, the range of preamble indexes which can be used on a RACH resource may be determined such that preamble indexes can be used on the RACH resource in an ascending order up to the number of preamble indexes available for the RACH resource. Then, the range of preamble indexes which can be used on a RACH resource in the same time direction (that is, on a frequency-multiplexed RACH resource) may be determined such that preamble indexes can be used in ascending order starting from a next preamble index up to the number of preamble indexes available for the RACH resource. After the range of preamble indexes on the RACH resource in the same time direction is determined, the range of preamble indexes which can be used on a time-multiplexed RACH resource may be determined such that preamble indexes can be used in ascending order starting from a next preamble index up to the number of preamble indexes available for the RACH resource. In this manner, when there are a plurality of frequency-multiplexed RACH resources and a plurality of time-multiplexed RACH resources, the range of preamble indexes may be determined in a sequential order for the plurality of frequency-multiplexed RACH resources and then the range of preamble indexes may be determined in a sequential order for the plurality of time-multiplexed RACH resources.

As described above, the number of preamble indexes available for the SS block is determined based on the number of preamble indexes available for one RACH resource and the number of RACH resources corresponding to one SS block. Thus, the number of RACH resources corresponding to one SS block may be provided or defined instead of the number of preamble indexes available for the SS block.

The number of preamble indexes available for the SS block may include both the number of preamble indexes for contention-based random access (CBRA) and the number of preamble indexes for contention free random access (CFRA). When a resource is individually allocated to the user equipment using any of the preamble indexes for CFRA, these preamble indexes for CFRA may be excluded. The number of preamble indexes available for the RACH resource may include the number of preamble indexes for both CBRA and CFRA on the RACH resource and the number of preamble indexes for either CBRA or CFRA on the RACH resource. The information as described above may be provided or defined. Based on the information, the range of preamble indexes for CBRA and the range of preamble indexes for CFRA on the RASH resource can be determined. Further, it can be determined how many RACH resources should be reserved corresponding to one SS block. Thus, the user equipment 200 can determine the range of preamble indexes available for the reserved RACH resource.

It should be noted that a preamble index has a one-to-one relationship with a preamble. Preambles may be generated based on preamble indexes. For example, preambles may be generated by providing a cyclic shift amount to a certain sequence (root index) in the order of preamble indexes and changing the root index once the cyclic shift amount reaches a threshold.

When the base station 100 receives the preamble, the base station 100 can identify, based on the resource on which the preamble is received and the same mapping rule as that of the user equipment 200, which of the SS blocks can be detected by the user equipment 200. The base station 100 transmits an RAR to the user equipment 200 in response to the received preamble. Then, a connection is established between the base station 100 and the user equipment 200.

Example 2

Figure 5:
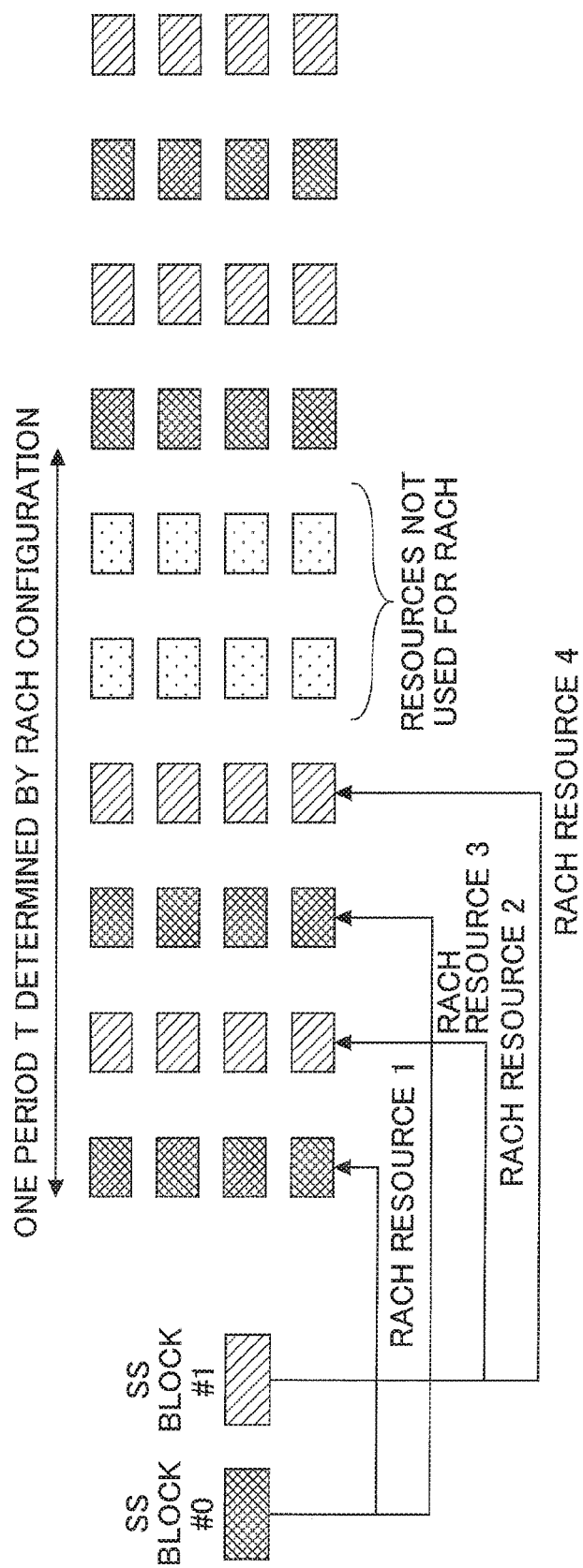
FIG. 5 is a diagram illustrating an example 2 of selecting a RACH resource for transmitting a preamble.

Next, with reference to FIG. 5, an example 2 of a preamble transmission procedure in a radio communication system according to the embodiment will be described in detail. FIG. 5 is a diagram illustrating the example 2 of selecting a resource for transmitting a preamble. In the example 2, a preamble is transmitted according to the preamble transmission procedure shown in FIG. 3. In the following, differences from the example 1 will be described in detail.

In step S101, the user equipment 200 determines resources available for transmission of a preamble based on the RACH Configuration included in the broadcast information. For example, as shown in FIG. 5, the user equipment 200 may determine, based on the RACH Configuration, that six RACH resources in the time direction and four RACH resources in the frequency direction are available in one period with a specified duration.

The user equipment 200 selects, from the resources available for transmission of the preamble, a RACH resource associated with the SS block in which the detected PSS, the detected SSS, or the detected PBCH is placed using a mapping rule defining a correspondence between an SS block in an SS burst set and a RACH resource. For example, as shown in FIG. 5, the mapping rule defines that a preamble for an SS block #0 is transmitted on a RACH resource 1, a preamble for an SS block #1 is transmitted on a RACH resource 2, and so on. Further, a preamble for the SS block #0 and a preamble for the SS block #1 are repeatedly transmitted on the remaining RACH resources. The number of repetitions may be provided by the base station 100 to the user equipment 200 via broadcast information or the like, or may be defined in advance in the specification. For example, the number of repetitions may be defined in the RACH Configuration Table. Alternatively, for example, the number of repetitions may be a maximum number of times that preambles can be repeatedly transmitted in the specified period T. In the example shown in FIG. 5, the preambles can be transmitted three times in the specified period T; thus, the number of repetitions may be determined as three.

As described above, all of the resources, available for transmission of the preamble in one period, which are determined based on the RACH Configuration may not be necessarily used for RACH. In the example 2, the user equipment 200 selects, from the resources, available for transmission of the preamble, which are determined based on the RACH Configuration, a RACH resource associated with the SS block according to the mapping rule and the number of repetitions. Then, resources which are not used for RACH may be used for another purpose such as transmission of another channel (for example, a data channel or a control channel).

In step S103, the user equipment 200 transmits a preamble to the base station 100 on the selected resource.

Example 3

In the examples 1 and 2, a RACH resource is selected based on a mapping rule defining a correspondence between an SS block in an SS burst set and a RACH resource. According to the examples 1 and 2, RACH resources at the same timing may be used for different SS blocks depending on the mapping rule.

For example, when analog beamforming is used, a beam direction is switched over time. When RACH resources at the same timing are selected for different SS blocks, there is a problem in that a preamble cannot be successfully transmitted and received. In an example 3, a mapping rule defining that different RACH resources with respect to the time direction are selected for different SS blocks is used.

For example, the mapping rule used in the example 3 may be a mapping rule defining that after one or more RACH resources necessary for one SS block are allocated among the resources, available for transmission of the preamble, which are determined based on the RACH Configuration, one or more RACH resources necessary for a next SS block are allocated among subsequent time resources. The number of RACH resources necessary for one SS block may be determined by providing both the number of RACH resources in the time direction and the number of RACH resources in the frequency direction from the base station 100 to the user equipment 200, or by defining them in the specification. Alternatively, the total number of RACH resources in the time direction and RACH resources in the frequency direction may be provided from the base station 100 to the user equipment 200 or may be defined in the specification. Further, the number of RACH resources necessary for one SS block may be determined based on the number of preamble indexes available for the SS block and the number of preamble indexes available for the RACH resource.

Figure 6:
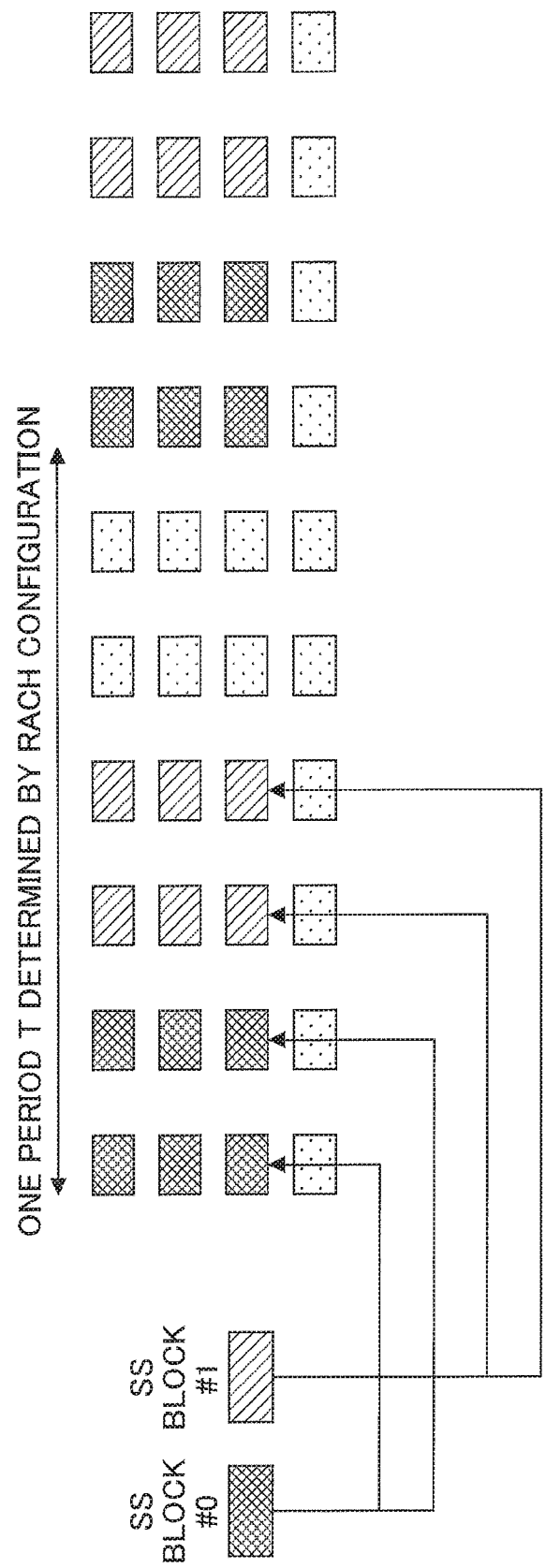
FIG. 6 is a diagram illustrating an example 3 of selecting a RACH resource for transmitting a preamble.

With reference to FIG. 6, the example 3 of a preamble transmission procedure in a radio communication system according to the embodiment will be described in detail. FIG. 6 is a diagram illustrating the example 3 of selecting a resource for transmitting a preamble. In the example 3, a preamble is transmitted according to the preamble transmission procedure shown in FIG. 3. In the following, differences from the example 1 will be described in detail.

In step S101, the base station 100 transmits a PSS, an SSS, and a PBCH to the user equipment 200. The user equipment 200 attempts to detect the PSS, the SSS, and the PBCH in the SS burst set. When the user equipment 200 can detect the PSS, the SSS, and the PBCH, the user equipment 200 can receive broadcast information on the PBCH, the PDSCH, or the like. The broadcast information provided to the user equipment 200 may further include a mapping rule flag, which indicates the use of a mapping rule defining that different RACH resources with respect to the time direction are selected for different SS blocks. In the embodiment, it is assumed that the mapping rule flag is included in the broadcast information. However, the mapping rule flag may be provided to the user equipment 200 via control information (for example, RRC signaling, DCI, or the like) other than the broadcast information, or may be defined in advance in the specification.

The user equipment 200 determines resources available for transmission of a preamble based on the RACH Configuration included in the broadcast information. For example, as shown in FIG. 6, the user equipment 200 may determine, based on the RACH Configuration, that six resources in the time direction and four resources in the frequency direction are available in one period with a specified duration.

When the user equipment 200 receives the mapping rule flag, the user equipment 200 uses the mapping rule defining that different RACH resources with respect to the time direction are selected for different SS blocks, instead of a mapping rule defining a correspondence between an SS block in an SS burst set and a RACH resource as described in the examples 1 and 2. The user equipment 200 selects, from the resources available for transmission of the preamble, one or more RACH resources associated with the SS block in which the detected PSS, the detected SSS, or the detected PBCH is placed using the mapping rule defining that different RACH resources with respect to the time direction are selected for different SS blocks. For example, when two RACH resources in the time direction and three RACH resources in the frequency direction are necessary for one SS block, the user equipment 200 selects six RACH resources for preamble transmission for an SS block #0, or selects, from time resources subsequent to the resources selected for the SS block #0, six RACH resources for preamble transmission for an SS block #1, as shown in FIG. 6.

As described above, all of the resources, available for transmission of the preamble in one period, which are determined based on the RACH Configuration may not be necessarily used for RACH. In the example 3, the user equipment 200 selects, from the resources, available for transmission of the preamble, which are determined based on the RACH Configuration, a RACH resource associated with the SS block according to the mapping rule. Then, resources which are not used for RACH may be used for another purpose such as transmission of another channel (for example, a data channel or a control channel).

In step S103, the user equipment 200 transmits a preamble to the base station 100 on the selected resource.

Example 4

In an example 4, a mapping rule defining that different RACH resources with respect to the time direction are selected for different SS blocks is used as in the example 3.

In the example 3, it is assumed that the number of RACH resources necessary for one SS block is determined. According to this assumption, as shown in FIG. 6, resources used for RACH and resources not used for RACH may coexist in the resources in the same time direction. In the example 4, a mapping rule defining that all the resources in the same time direction are used for preamble transmission corresponding to one SS block is used.

For example, the mapping rule used in the example 4 may be a mapping rule defining that after one or more RACH resources necessary for one SS block are determined among the resources, available for transmission of the preamble, which are determined based on the RACH Configuration, and then all the resources in the same time direction (at the same timing) as the determined RACH resources are allocated, one or more RACH resources necessary for a next SS block are determined among subsequent time resources, and then all the resources in the same time direction as the determined RACH resources are allocated. For example, the one or more RACH resources necessary for one SS block may be determined by providing RACH resources available for one SS block or a part of the number of preamble indexes from the base station 100 to the user equipment 200, or by defining them in the specification. For example, RACH resources available for one SS block in the time direction may be indicated and a preamble may be transmitted on all the indicated RACH resources. Alternatively, RACH resources necessary for one SS block may be determined by providing the minimum, number of RACH resources or the minimum number of preamble indexes available for one SS block from the base station 100 to the user equipment 200, or may be defined in the specification. For example, the minimum number of RACH resources available for one SS block may be indicated and a preamble may be transmitted on all the RACH resources in the same time direction.

Figure 7:
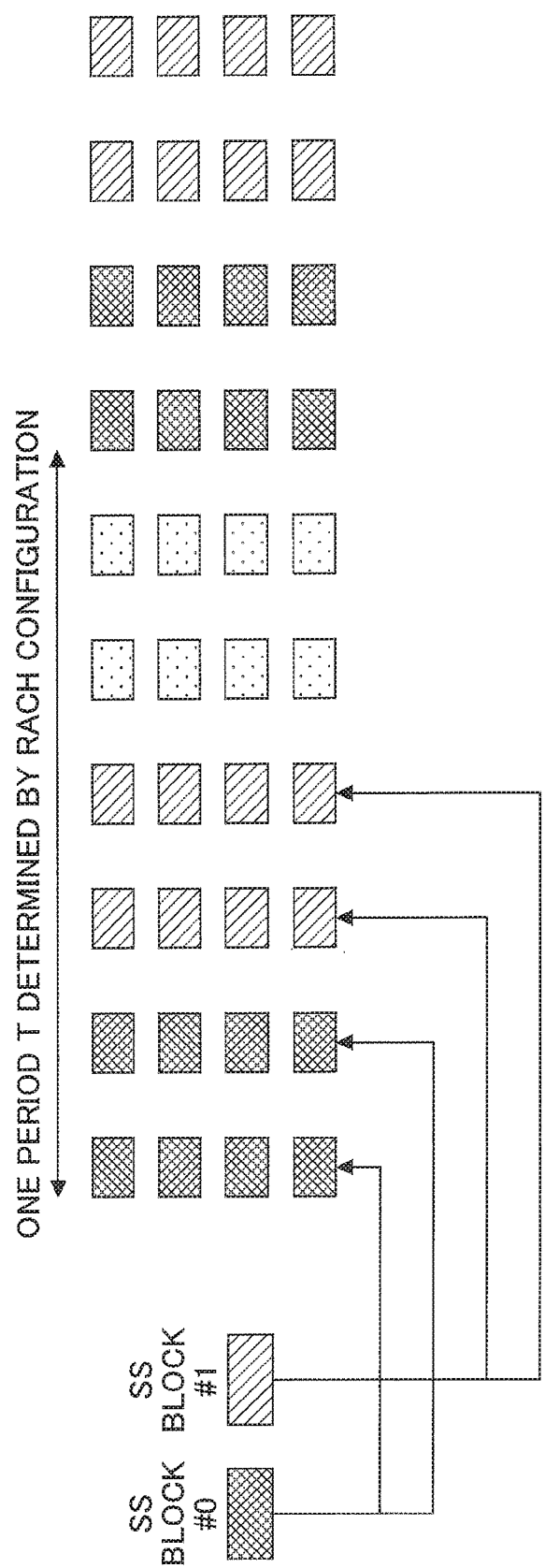
FIG. 7 is a diagram illustrating an example 4 of selecting a RACH resource for transmitting a preamble.

With reference to FIG. 7, the example 4 of a preamble transmission procedure in a radio communication system according to the embodiment will be described in detail. FIG. 7 is a diagram illustrating the example 4 of selecting a resource for transmitting a preamble. In the example 4, a preamble is transmitted according to the preamble transmission procedure shown in FIG. 3. In the following, differences from the example 3 will be described in detail.

In step S101, the user equipment 200 determines resources available for transmission of a preamble based on the RACH Configuration. For example, as shown in FIG. 7, the user equipment 200 may determine, based on the RACH Configuration, that six resources in the time direction and four resources in the frequency direction are available in one period with a specified duration.

When the user equipment 200 receives the mapping rule flag, the user equipment 200 uses the mapping rule defining that different RACH resources with respect to the time direction are selected for different SS blocks, instead of a mapping rule defining a correspondence between an SS block in an SS burst set and a RACH resource as described in the examples 1 and 2. In this mapping rule, all the resources in the same time direction are used for preamble transmission corresponding to one SS block. The user equipment 200 selects, from the resources available for transmission of the preamble, one or more RACH resources associated with the SS block in which the detected PSS, the detected SSS, or the detected PBCH is placed using this mapping rule. For example, when two RACH resources in the time direction are necessary for one SS block, the user equipment 200 selects all the RACH resources (i.e., eight RACH resources) corresponding to two RACH resources in the time direction for preamble transmission for an SS block #0, or selects, from the resources subsequent to the resources selected for the SS block #0, all the RACH resources (i.e., eight RACH resources) corresponding to two RACH resources in the time direction for preamble transmission for an SS block #1, as shown in FIG. 7.

As described above, all of the resources, available for transmission of the preamble in one period, which are determined based on the RACH Configuration may not be necessarily used for RACH. In the example 4, the user equipment 200 selects, from the resources, available for transmission of the preamble, which are determined based on the RACH Configuration, a RACH resource associated with the SS block according to the mapping rule. Then, resources which are not used for RACH may be used for another purpose such as transmission of another channel (for example, a data channel or a control channel).

In step S103, the user equipment 200 transmits a preamble to the base station 100 on the selected resource.

<Functional Configuration of Base Station>

Figure 8:
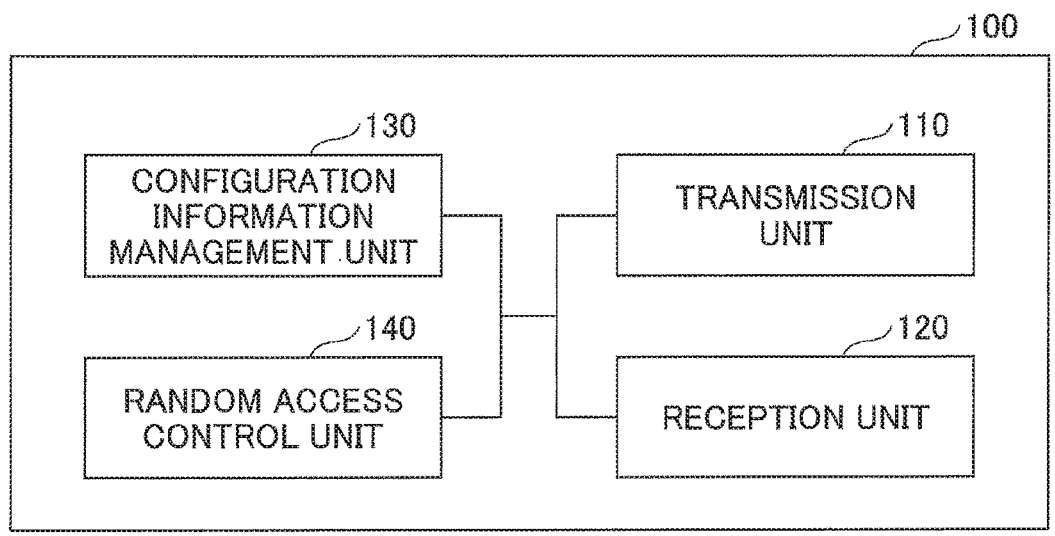
FIG. 8 is a block diagram illustrating an example of a functional configuration of a base station.

FIG. 8 is a block diagram illustrating an exemplary functional configuration of a base station 100. The base station 100 includes a transmission unit 110, a reception unit 120, a configuration information management unit 130, and a random access control unit 140. The functional configuration illustrated in FIG. 8 is merely an example. The functional division and names of the functional units are not limited to the example illustrated in FIG. 8 as long as the operations according to the embodiment can be performed.

The transmission unit 110 is configured to generate a lower layer signal from higher-layer information and wirelessly transmit the signal. The transmission unit 110 transmits signals such as a PSS, an SSS, and a PBCH. The reception unit 120 is configured to wirelessly receive various signals and obtain higher-layer information from the received signals.

The configuration information management unit 130 stores predefined configuration information. The configuration information management unit 130 also determines configuration information (for example, a RACH Configuration, a mapping rule, the number of preamble indexes available for an SS block, the number of preamble indexes available for a RACH resource, a mapping rule index, or any configuration used in the embodiment) to be provided to the user equipment 200 and stores the configuration information. The configuration information management unit 130 sends to the transmission unit 110 the configuration information to be provided to the user equipment 200 to cause the transmission unit 110 to transmit the configuration information.

The random access control unit 140 manages a random access procedure for the user equipment 200. When the random access control unit 140 receives a preamble from the user equipment 200, the random access control unit 140 causes the transmission unit 110 to transmit an RAR. When the random access control unit 140 receives an RRC Connection. Request from the user equipment 200, the random access control unit 140 causes the transmission unit 110 to transmit an RRC Connection Setup.

<Functional Configuration of User Equipment>

Figure 9:
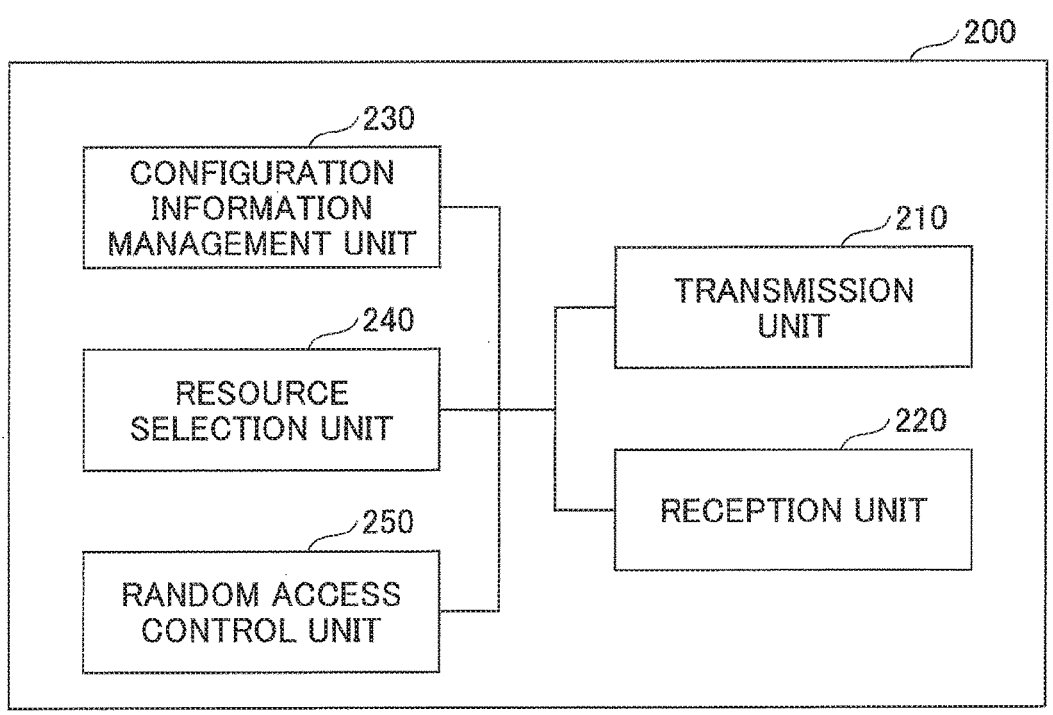
FIG. 9 is a block diagram illustrating an example of a functional configuration of user equipment.

FIG. 9 is a block diagram illustrating an exemplary functional configuration of user equipment 200. The user equipment 200 includes a transmission unit 210, a reception unit 220, a configuration information management unit 230, a resource selection unit 240, and a random access control unit 250. The functional configuration illustrated in FIG. 9 is merely an example. The functional division and names of the functional units are not limited to the example illustrated in FIG. 9 as long as the operations according to the embodiment can be performed.

The transmission unit 210 is configured to generate a lower-layer signal from higher-layer information and wirelessly transmit the signal. The transmission unit 210 transmits a preamble based on configuration information stored in the configuration information management unit 230 as described below. The reception unit 220 is configured to wirelessly receive various signals and obtain higher-layer information from the received signals. The reception unit 220 receives signals such as a PSS, an SSS, and a PBCH from the base station 100. The reception unit 220 also receives configuration information (for example, a RACH Configuration, a mapping rule, the number of preamble indexes available for an SS block, the number of preamble indexes available for a RACH resource, a mapping rule index, or any configuration used in the embodiment) from the base station 100 or the like.

The configuration information management unit 230 stores predefined configuration information and the configuration information provided from the base station 100 or the like. The configuration information which can be managed by the configuration management unit 230 includes not only the configuration information provided from the base station 100 or the like but also configuration information defined in advance in the specification.

The resource selection unit 240 determines resources available for transmission of the preamble based on the configuration information stored in the configuration information management unit 230. Further, the resource management unit 240 selects, from the resources available for transmission of the preamble, a RACH resource for transmitting the preamble based on the mapping rule stored in the configuration information management unit 230. The resource selection unit 240 also determines the range of preamble indexes which can be used on the RACH resource.

The random access control unit 250 manages a random access procedure for the base station 100. When the user equipment 200 establishes a connection to the base station 100 or re-synchronizes with the base station 100 for originating a call, for handover, or the like, the random access control unit 250 causes the transmission unit 210 to transmit a preamble randomly selected from a plurality of preambles. Further, when the preamble is transmitted but the random access control unit 250 does not receive an RAR that is a response to the preamble within a period called an RAR window, for example, the random access control unit 250 causes the transmission unit 210 to retransmit the preamble. When the random access control unit 250 receives an RAR from the base station 100, the random access control unit 250 causes the transmission unit 210 to transmit an RRC Connection Request.

<Hardware Configuration>

The block diagrams used to describe the above-mentioned embodiment illustrate blocks of functional units. The functional blocks (components) are implemented by an arbitrary combination of hardware and/or software. A means for implementing each functional block is not particularly limited. That is, each functional block may be implemented by one apparatus in which a plurality of elements are physically and/or logically coupled or by a plurality of apparatuses that are physically and/or logically separated from each other and are connected directly and/or indirectly (for example, in a wired manner and/or wirelessly).

Figure 10:
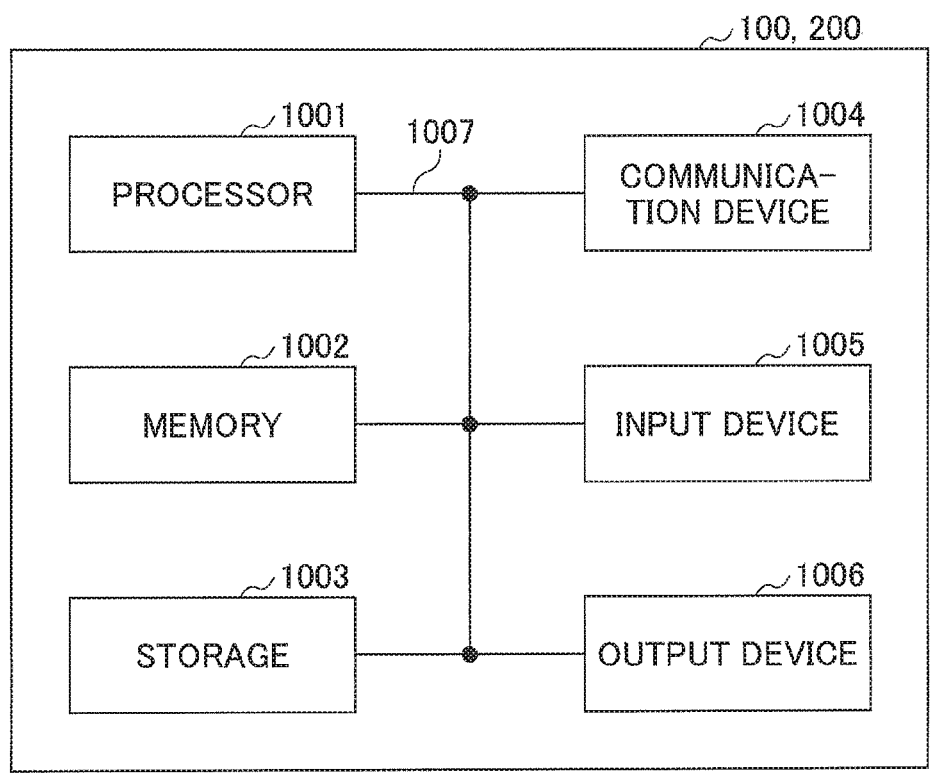
FIG. 10 is a diagram illustrating an example of a hardware configuration of a radio communication apparatus according to an embodiment of the present invention.

For example, the base station, the user equipment, or the like according to the embodiment of the invention may function as a computer that performs a preamble transmission method according to this embodiment. FIG. 10 is a diagram illustrating an example of a hardware configuration of a radio communication apparatus such as the base station 100 or the user equipment 200 according to this embodiment. Each of the base station 100 and the user equipment 200 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, or a unit. The hardware configuration of the base station 100 or the user equipment 200 may include one or a plurality of devices illustrated in FIG. 10 or may not include some of the devices.

Each function of the base station 100 and the user equipment 200 may be implemented by the following process: predetermined software (program) is read onto hardware such as the processor 1001 or the memory 1002, and the processor 1001 performs an operation to control the communication of the communication device 1004 and the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, the transmission unit 110, the reception unit 120, the configuration information management unit 130, and the random access control unit 140 in the base station 100, as well as the transmission unit 210, the reception unit 220, the configuration information management unit 230, the resource selection unit 240, and the random access control unit 250 in the user equipment 200 may be implemented in the processor 1001.

The processor 1001 reads a program (program code), a software module, and/or data from the storage 1003 and/or the communication device 1004 to the memory 1002 and performs various types of processes according to the program, the software module, or the data. A program that causes a computer to perform at least some of the operations described in the embodiment map be used. For example, the transmission unit 110, the reception unit 120, the configuration information management unit 130, and the random access control unit 140 in the base station 100, as well as the transmission unit 210, the reception unit 220, the configuration information management unit 230, the resource selection unit 240, and the random access control unit 250 in the user equipment 200 may be implemented by a control program that is stored in the memory 1002 and is executed by the processor 1001. The other functional blocks may be similarly implemented. In the embodiment, the above-mentioned various processes are performed by one processor 1001. However, the processes may be simultaneously or sequentially performed by two or more processors 1001. The processor 1001 may be mounted on one or more chips. The program may be transmitted over the network through a telecommunication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, an executable program (program code) and a software module that can perform a preamble transmission method according to the embodiment of the invention.

The storage 1003 is a computer-readable recording medium and may include, for example, at least one of an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be also referred to as an auxiliary storage device. The above mentioned storage medium may be, for example, a database, a server, and other suitable media including the memory 1002 and/or the storage 1003.

The communication device 1004 is hardware (a transmission and reception device) for communicating with a computer through a wired and/or wireless network and is also referred to as, for example, a network device, a network controller, a network card, or a communication module. For example, the transmission unit 110, the reception unit 120, the transmission unit 210, the reception unit 220, and the like may be implemented by the communication device 1004.

The input device 1005 is an input unit (for example, a keyboard, a mouse, a microphone, a switch, a button, or a sensor) that receives an input from the outside. The output device 1006 is an output unit (for example, a display, a speaker, or an LED lamp) that performs an output process to the outside. The input device 1005 and the output device 1006 may be integrated into a single device (for example, a touch panel).

Devices such as the processor 1001 and/or the memory 1002 are connected to each other via the bus 1007 for information communication. The bus 1007 may be a single bus or the devices may be connected to each other by different buses.

Each of the base station 100 and the user equipment 200 may include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by at least one of these hardware components.

Summary of Embodiments

As described above, in an embodiment of the present invention, there is provision for user equipment for transmitting a preamble at any timing after synchronization with a base station, including:

a reception unit that detects a synchronization signal or a physical broadcast channel from the base station;

a resource selection unit that determines resources available for transmission of the preamble based on configuration information for preamble transmission, and selects, from the resources available for transmission of the preamble, a resource for transmitting the preamble according to the detected synchronization signal or the detected physical broadcast channel based on a mapping rule; and a transmission unit that transmits the preamble to the base station on the selected resource.

The user equipment can select an appropriate RACH resource according to an SS block from the resources available for RACH, by using the mapping rule. Further, a base station can identify which of the SS blocks can be detected by the user equipment, by using the same mapping rule.

The resource selection unit may select the resource associated with a synchronization signal block in which the detected synchronization signal or the detected physical broadcast channel is placed, by using a mapping rule defining a correspondence between a synchronization signal block in which a synchronization signal or a physical broadcast channel is placed and a resource for transmitting a preamble.

When an SS block is repeatedly arranged in an SS burst set, as described with reference to FIG. 2, it is expected that a correspondence between an SS block and a RACH resource will be defined. The user equipment can select an appropriate RACH resource associated with an SS block, by using the correspondence.

The resource selection unit may select the resource associated with a synchronization signal block in which the detected synchronization signal or the detected physical broadcast channel is placed, by using a mapping rule defining that different resources with respect to a time direction are selected for different synchronization signal blocks.

The user equipment can transmit a preamble suitable for the case where analog beamforming is used, by using the mapping rule defining that different RACH resources with respect to a time direction are selected for different SS blocks.

The resource selection unit may determine, based on a number of preamble indexes available for one synchronization signal block and a number of preamble indexes available for one resource, a range of preamble indexes which can be used on the selected resource.

When a plurality of frequency-multiplexed resources and a plurality of time-multiplexed resources are selected, the resource selection unit may determine a range of preamble indexes in a sequential order for the plurality of frequency-multiplexed resources and then determine a range of preamble indexes in a sequential order for the plurality of time-multiplexed resources.

While the number of preamble indexes is fixed to 64 in LTE, the user equipment can determine the range of preamble indexes suitable for each RACH resource to control contention of a preamble.

Supplementary Explanation

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide-Band (UWB), Bluetooth (registered trademark), and other suitable systems and/or next-generation systems that have functionality enhanced based on these systems.

The terms "system" and "network" used in the specification are interchangeably used.

In the specification, a specific operation performed by the base station may be performed by an upper node of the base station. In a network having one or a plurality of network nodes including the base station, it is clearly understood that various operations performed for communication with the user equipment can be performed by the base station and/or a network node (for example, including an MME or an S-GW without limitation) other than the base station. The number of network nodes other than the base station is not limited to one, and a plurality of other network nodes (for example, an MME and an S-GW) may be combined with each other.

Information or the like can be output from a higher layer (or a lower layer) to a lower layer (or a higher layer). Information or the like may be input or output via a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

The transmission of information is not limited to the aspects/embodiments described in the specification and may be performed by other means. For example, the transmission of information may be performed by physical layer signaling (for example, downlink control information (DCI) or uplink control information (UCI)), higher layer signaling (for example, radio resource control (RRC) signaling, medium access control (MAC) signaling, or broadcast information (a master information block (MIB) and a system information block (SIB))), another signal, or a combination thereof. The RRC signaling may be also referred to as an RRC message and may be, for example, an RRC connection setup message or an RRC connection reconfiguration message.

Determination may be made based on a value (0 or 1) represented by 1 bit, may be made based on a true or false value (boolean: true or false), or may be made based on comparison with a numerical value (for example, comparison with a predetermined value).

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The information, the signal, and the like described in the specification may be represented using any of various technologies. For example, the data, the instruction, the command, the information, the signal, the bit, the symbol, the chip, and the like mentioned throughout the description may be represented by a voltage, a current, an electromagnetic wave, a magnetic field, or a magnetic particle, an optical field or a photon, or any combination thereof.

The terms described in the specification and/or terms necessary to understand the specification may be replaced with terms that have same or similar meanings. For example, a channel and/or a symbol may be a signal. A signal may be a message. A component carrier (CC) may be referred to as a carrier frequency, a cell, or the like.

The information, the parameter, or the like described in the specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters are used can be different from the numerical expression disclosed explicitly in the specification. Since various channels (for example, a PUCCH and a PDCCH) and information elements (for example, TPC) can be identified with any suitable names, various names allocated to the various channels and the information elements are not limited in any respect.

The terms "determining" and "deciding" used in the specification include various operations. The terms "determining" and "deciding" can include, for example, "determination" and "decision" for calculating, computing, processing, deriving, investigating, looking-up (for example, looking-up in a table, a database, or another data structure), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The term "based on" used in the specification does not mean "only based on" unless otherwise stated. In other words, the term "based on" means both "only based on" and "at least based on".

When reference is made to elements in which terms "first," "second," and the like are used in the specification, the number or the order of the elements is not generally limited. These terms can be used in the specification as a method to conveniently distinguish two or more elements from each other. Accordingly, reference to first and second elements does not imply that only two elements are employed or the first element is prior to the second element in some ways.

The terms "include" and "including" and the modifications thereof are intended to be inclusive, similarly to the term "comprising", as long as they are used in the specification or the claims. In addition, the term "or" used in the specification or the claims does not mean exclusive OR.

In each aspect/embodiment described in the specification, for example, the order of the processes in the procedure, the sequence, and the flowchart may be changed unless a contradiction arises. For example, for the method described in the specification, elements of various steps are presented in the exemplified order. However, the invention is not limited to the presented specific order.

The aspects/embodiments described in the specification may be individually used, may be combined, or may be switched during execution. In addition, transmission of predetermined information (for example, transmission of "being X") is not limited to being performed explicitly, but may be performed implicitly (for example, the transmission of the predetermined information is not performed).

The invention has been described in detail above. It will be apparent to those skilled in the art that the invention is not limited to the embodiments described in the specification. Various modifications and changes can be made, without departing from the scope and spirit of the invention described in the claims. Therefore, the embodiments described in the specification are illustrative and do not limit the invention.

DESCRIPTION OF NOTATIONS 100 base station
110 transmission unit
120 reception unit
130 configuration information management unit
140 random access control unit
200 user equipment
210 transmission unit
220 reception unit
230 configuration information management unit.
240 resource selection unit
250 random access control unit

The invention claimed is:
1. A terminal, comprising:
a receiver that receives configuration information with respect to a number of available random access preamble indexes;
a processor that selects, based on the configuration information, a resource for transmitting a random access preamble according to one synchronization signal block including a synchronization signal and a physical broadcast channel, the one synchronization signal block being selected from a synchronization block set including one or more synchronization signal blocks, and determines a range of available random access preamble indexes in the selected resource; and
a transmitter that transmits the random access preamble within the determined range, wherein after the selected synchronization signal block is associated with the selected resource a plurality of times within a period, when there is an unused resource within the period, the transmitter does not transmit the random access preamble in the unused resource.

2. The terminal as claimed in claim 1,
wherein the configuration information includes a number of contention-based random access preamble indexes that are available for both one synchronization signal block and a resource for transmitting one random access preamble, and
the processor determines, based on the configuration information, a range of random access preamble indexes available for contention-based random access in the selected resource.

3. The terminal as claimed in claim 1,
wherein when the synchronization signal blocks included in the synchronization signal block set are associated with a plurality of resources for transmitting a random access preamble,
the processor associates the selected synchronization signal block with the plurality of resources, in an ascending order of random access preamble indexes and in an order of a first resource, a second resource which is frequency-multiplexed with the first resource, and a third resource which is time-multiplexed with the first resource.

4. The terminal as claimed in claim 2,
wherein when the synchronization signal blocks included in the synchronization signal block set are associated with a plurality of resources for transmitting a random access preamble,
the processor associates the selected synchronization signal block with the plurality of resources, in an ascending order of random access preamble indexes and in an order of a first resource, a second resource which is frequency-multiplexed with the first resource, and a third resource which is time-multiplexed with the first resource.

5. The terminal as claimed in claim 1,
wherein the association that is performed the plurality of times is a maximum number of association according to which the synchronization signal blocks included in the synchronization signal block set can be mapped to the selected resource.

6. A random access preamble transmission method, comprising:
receiving configuration information with respect to a number of available random access preamble indexes;
selecting, based on the configuration information, a resource for transmitting a random access preamble according to one synchronization signal block including a synchronization signal and a physical broadcast channel, the one synchronization signal block being selected from a synchronization block set including one or more synchronization signal blocks, and determining a range of available random access preamble indexes in the selected resource; and
transmitting the random access preamble within the determined range,
wherein after the selected synchronization signal block is associated with the selected resource a plurality of times within a period, when there is an unused resource within the period, the random access preamble in the unused resource is not transmitted.

7. A base station, comprising:
a transmitter that transmits configuration information with respect to a number of available random access preamble indexes; and
a receiver that receives a random access preamble which is transmitted according to one synchronization signal block including a synchronization signal and a physical broadcast channel, the one synchronization signal block being selected from a synchronization signal block set including one or more synchronization signal blocks,
wherein a range of indexes of the random access preamble is a range of available random access preamble indexes in a resource in which the random access preamble is transmitted, the resource being selected based on the configuration information, and
wherein after the selected synchronization signal block is associated with the selected resource a plurality of times within a period, when there is an unused resource within the period, the receiver does not receive the random access preamble in the unused resource.

* * * * *